(12) United States Patent
Liu et al.

(10) Patent No.: US 6,996,192 B1
(45) Date of Patent: Feb. 7, 2006

(54) ADAPTED PHASE NOISE ESTIMATION AND COMPENSATION

(75) Inventors: Qin Liu, Fremont, CA (US); Lin Yang, Fremont, CA (US)

(73) Assignee: Legend Silicon Corporation, Fremont, CA (US)

( * ) Notice: Subject to any disclaimer, the term of this patent is extended or adjusted under 35 U.S.C. 154(b) by 448 days.

(21) Appl. No.: 10/359,430

(22) Filed: Feb. 5, 2003

(51) Int. Cl.
*H04L 27/06* (2006.01)

(52) U.S. Cl. .................. 375/316; 375/226; 375/371
(58) Field of Classification Search ............ 375/316, 375/371, 373, 226, 344
See application file for complete search history.

(56) References Cited

U.S. PATENT DOCUMENTS 5,987,063 A * 11/1999 Rinne .................. 375/226

2003/0053564 A1 * 3/2003 Kim et al. ............... 375/326
2003/0223524 A1 * 12/2003 Mennenga et al. ......... 375/371

* cited by examiner

*Primary Examiner*—Temesghen Ghebretinsae

(74) *Attorney, Agent, or Firm*—Patent Law Group LLP; Carmen C. Cook

(57) ABSTRACT

Method and system for adaptively estimating and compensating for phase noise error in a received signal s(t;data). A plurality of transmission parameter symbol (TPS) sets, each with a representative TPS group frequency, are incorporated in the signal before transmission. Received channel response amplitudes are analyzed to select a particular TPS frequency group, and inverse Fourier transforms, N(t) and D(t), are computed for these chosen signals. A complex ratio, r(t)=N(t)/D(t), is computed and used to determine a phase angle $\phi(t)$. A phase noise error compensated, time domain signal, equal to $\exp\{-j\phi(t)\} \cdot s(t-\Delta t(\text{delay});\text{data})$ is provided.

24 Claims, 6 Drawing Sheets

ADAPTED PHASE NOISE ESTIMATION AND COMPENSATION

FIELD OF THE INVENTION

This invention relates to compensation for phase irregularities in a received signal, such as an ofdm signal.

BACKGROUND OF THE INVENTION

When a signal, even an ideal signal, is transmitted, the transmission channel and signal processing devices introduce signal distortions (multipath, noise, phase noise, etc.), which makes it more difficult to sort out the "true" transmitted signal at the receiving end. Distortions introduced by the transmission channel distortion(s) are time varying and are especially troublesome when dealing with certain classes of signals, such as ofdm signals. Some of the methods previously used to estimate the channel distortion require extensive use of supplementary signals, such as pilot signals, do not take account of variation of the distortion with time (frame-to-frame) or variation of the distortion with signal frequency.

What is needed is an approach that provides compensation for distortions of phase and other signal features in an in-phase/quadrature signal environment that is flexible, allows straight-through signal processing, has tolerable latency, accounts for frame-to-frame variation, and is relatively simple.

SUMMARY OF THE INVENTION

These needs are met by the invention, which receives a frame with a data sequence including two or more transmission parameter symbol (TPS) sets from a transmission channel. A TPS choice procedure analyzes effects of the transmission and selects one of the TPS sets for further processing, based on one or more selected criteria, determines a phase factor, and determines a phase correction for the received TPS frame. The phase correction is combined with a time delayed version of the received time domain signal to provide a received signal that is corrected for phase error.

DESCRIPTION OF BEST MODES OF THE INVENTION

A frequency domain (FD) signal (e.g., a frame), generated and transmitted by a transmitter system, includes a known indicium portion of the frame, which identifies the particular frame, and a remainder or data portion. Where the signals are ofdm frames, for example, the indicium portion may be a pseudo-noise component or another signal component that allows identification of the particular frame. The data portion of a more general "TPS frame" is expressed as K data segments, denoted Data(k) (k=1, . . . , K; K≧2), of a data sequence in the frequency domain, with each consecutive pair of data segments being separated by, or associated with, a known transmission parameter symbol (TPS) set, defined in the frequency domain and expressed as a sequence of pairs of frequency and complex amplitude values $\{f,A(f)\}_{f \in Fh}$ (h=1, . . . , K-1). Each TPS set corresponds to a selected group frequency, $f=f_{h,g}$, and to a group of frequencies adjacent to the group frequency, as illustrated in a power spectral density graph PSD(f) for this signal in FIG. 1. The content of each TPS set is known, but the contents of the data segments Data(k) are arbitrary. The TPS sets are included in the given signal protocol and are utilized to characterize the received TPS frame. A statistical average, such as a weighted mean, a median, a mode or any other suitable statistical average, denoted Avg{data}, of amplitudes of the frequency domain (FD) data portion and a statistical average, denoted Avg(resp), of the FD channel response portion of the received frame are computed.

Figure 2:
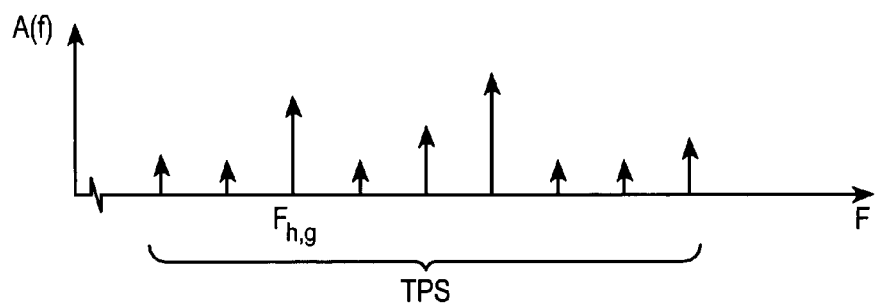
FIG. 2 is a graphical view of a typical TPS set used with the invention

FIG. 2 graphically illustrates an example of the amplitudes |A(f)| of a TPS set that can be used to practice the invention. A TPS set $\{f,A(f)\}_{f \in Fh}$ has a known TPS complex amplitude A(f) associated with each of a sequence or group of adjacent frequencies, $f \in F_h$, in the symbol set, and at least two amplitudes, A(f') and A(f"), in the TPS set are non-zero. One amplitude $A(f_{h,g})$, corresponding to a selected representative frequency, $f=f_{h,g}$, (referred to as the "group frequency" herein) in the TPS set has an amplitude magnitude |A(f)| that is substantially higher than at least one other non-zero amplitude magnitude |A(f')|(f=$f_{h,g}$; f'≠$f_{h,g}$) for the other frequencies in the frequency group $F_h$. Herein, the phrase "transmission parameter symbol set" or "TPS set" will refer to a set of pairs of known values, $\{f,A(f)\}_{f \in F}$, in which: (1) F is a known group of adjacent frequencies having a selected frequency range and a group frequency $f_{h,g}$; (2) each frequency f∈F has an associated known amplitude A(f) and at least two of the amplitudes A(f) in the group F are non-zero; and (3) the group frequency $f_{h,g}$ has a corresponding magnitude |A($f_{h,g}$)| that is much larger than at least one other non-zero magnitude |A(f)| with f≠$f_{h,g}$ (f∈$F_h$) and is much larger than the statistical average for the FD data portion, Avg(data). Preferably, at least two TPS sets are included with any data sequence or TPS frame. In the example in FIG. 2, three magnitudes of the TPS amplitudes A(f), including A($f_{h,g}$), are substantially larger than the magnitudes |A(f)| of all other non-zero TPS amplitudes. The frequency group $\{f \in F_h\}$ may be, but need not be, symmetric, and the individual non-zero amplitudes A(f) may have either signum and may be arranged in any order.

Figure 1:
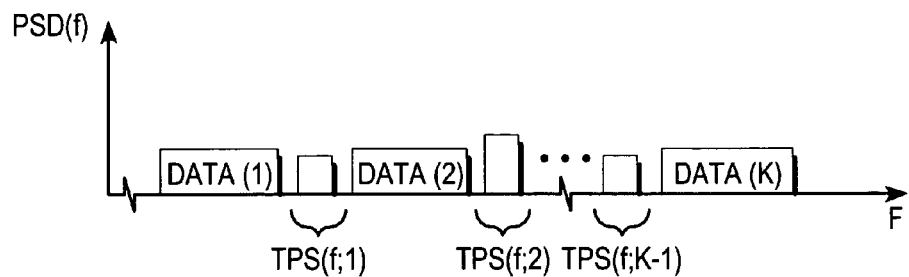
FIG. 1 is a graphical view illustrating incorporation of a set of TPS signals into a data sequence stream.

Each TPS set in FIG. 1 has a selected TPS group frequency, $f=f_{h,g}$, with a group frequency magnitude |A($f_{h,g}$)| that is much larger than the statistical average Avg{data}. Each pair of values $\{f,A(f)\}$ in a TPS set is known and can be generated in a signal receiver system such as 30, schematically illustrated in FIG. 3. The TPS sets used by the receiver system 30 to determine and compensate for the phase noise present in the received signal. A TPS set $\{f,A(f)\}_{f \in Fh}$, sent through the transmission channel, becomes a set $\{f,S(f;resp) \cdot A(f)\}_{f \in Fh}$, when received at the receiver, where S(f;resp) is referred to as a channel response (CR) amplitude for the set $F_h$.

Figure 3:
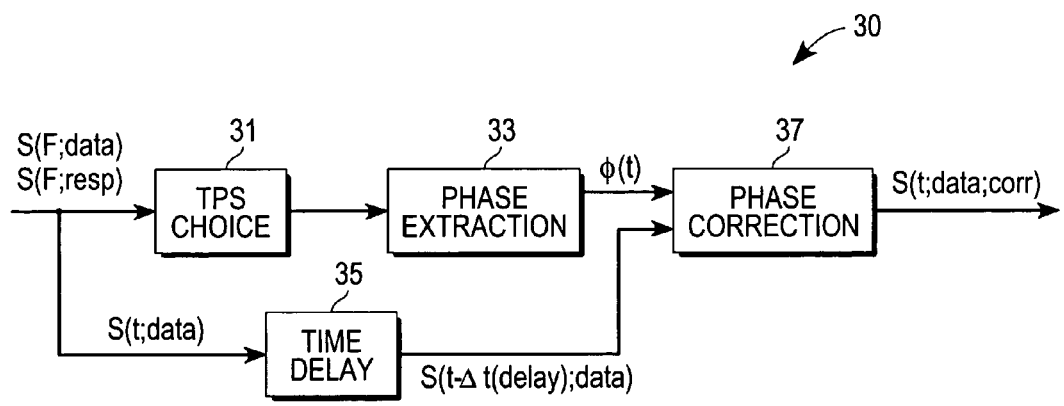
FIGS. 3, 4 and 5 schematically illustrate receiver systems for practicing the invention.

The receiver system 30 in FIG. 3 receives an FD CR amplitude S(f;resp), and an FD data portion S(f;data) and a time domain (TD) data portion s(t;data). The data portion and CR amplitude are received and processed by a TPS choice module 31 that analyzes the TPS sets and selects one TPS set index, h=h0, based on one or more TPS choice criteria, and uses the selected TPS group frequencies for further analysis The selected TPS set, $\{f,A(f)\}_{f \in Fh0}$, and the FD data portion S(f;data) are received and analyzed further by a phase determination module 33 that determines and issues a phase correction $\phi$(t) for the received TPS frame. A TD version of the received signal is passed through a time delay module 35, which imposes a time delay $\Delta$t(delay) corresponding to the signal processing time for the modules 31 and 33. A time delayed TD received signal s(t−$\Delta$t(delay)) and the phase correction $\phi$(t) are received at a phase correction module 37, which applies the phase correction and generates and issues an output signal s(t;data;corr) in which the phase error is partly or fully corrected.

Figure 4:
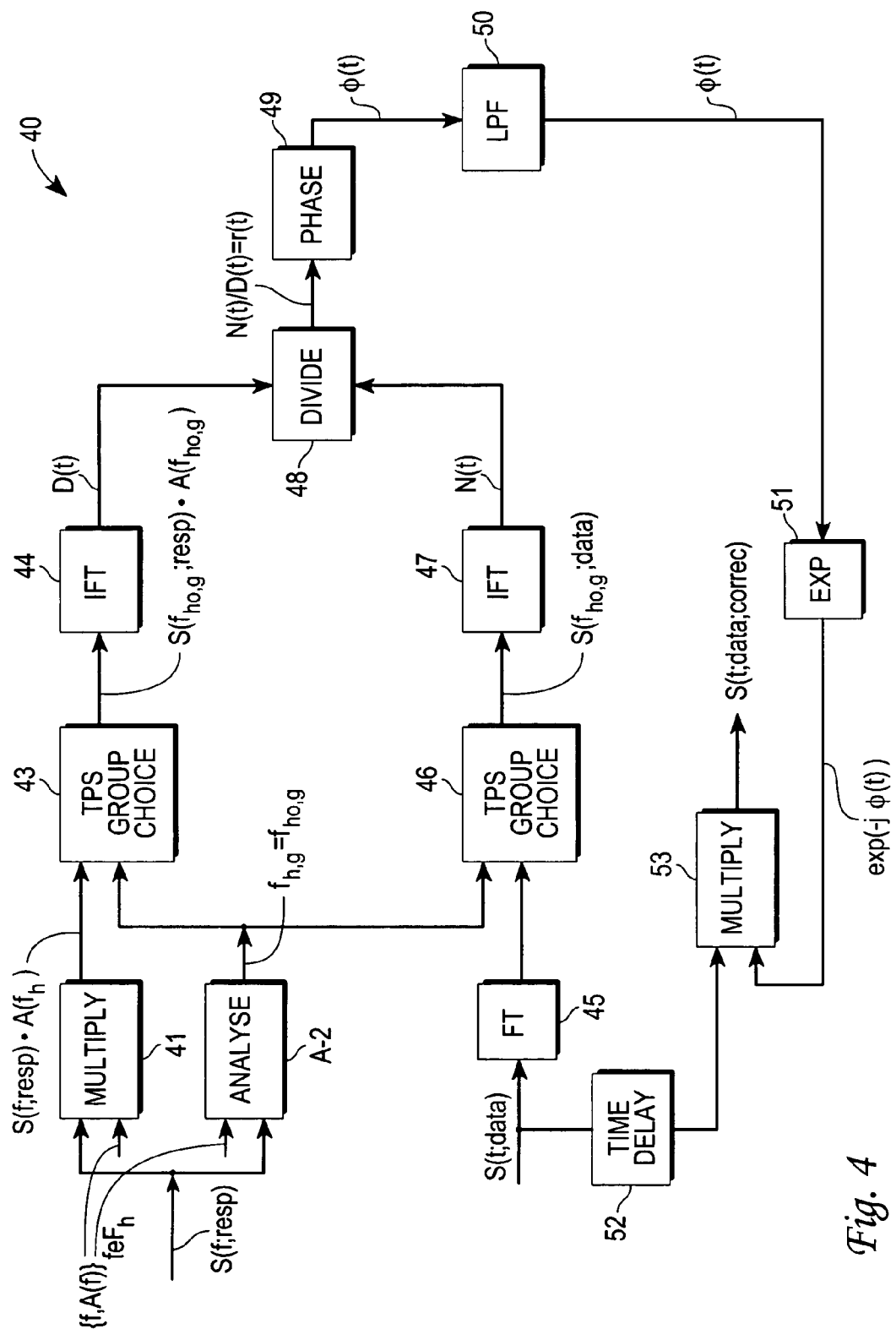

FIG. 4 illustrates, in more detail, a receiver system 40 that can be used to process a received signal as indicated in FIG. 3. The receiver system 40 receives an FD signal including a CR amplitude S(f;resp) and a data portion S(f;data), with a corresponding TD data portion s(t;data). Each of a first multiply module 41 and an analysis module 42 receives the CR amplitude S(f;resp) (after suitable receiver processing), representing response of the wireless or wired transmission channel. Each of the first multiply module 41 and the analysis module 42 also receives, or is internally provided with, the TPS sets $\{f,A(f)\}_{f \in Fh}$ (h=1, . . . , K-1). The first multiply module 41 forms or is provided with a product $S(f_{h,g};resp) \cdot A(f_{h,g})$, with frequency f restricted to the frequency group $F_h$, and this output CR signal is received at a first input terminal of a first TPS group choice module 43.

Figure 6:
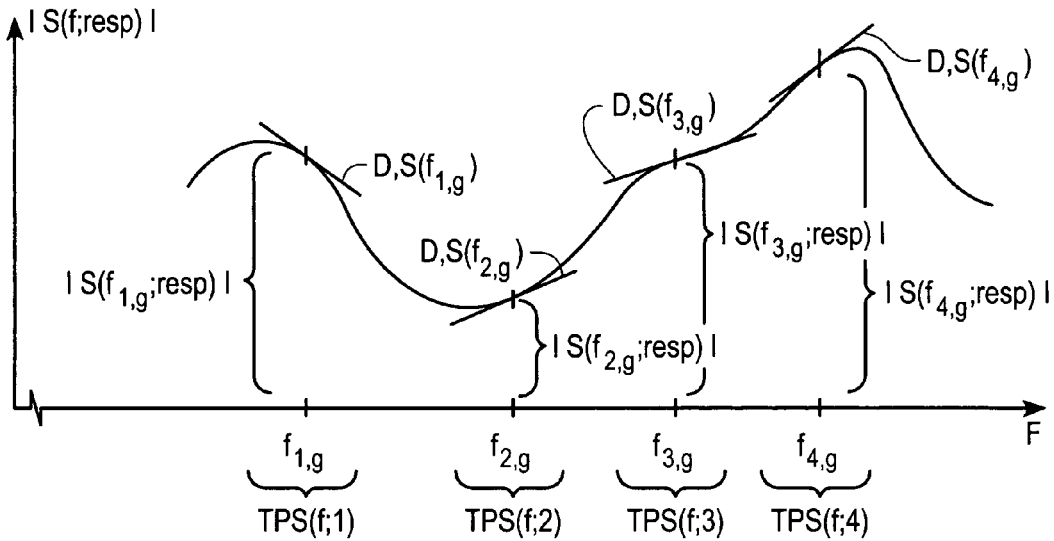
FIG. 6 is a graphical view of a CR amplitude in the frequency domain, for each of several TPS set frequency neighborhoods.

The analysis module 42 receives the CR amplitude S(f; resp) and analyzes each frequency group $F_h$ of the TPS sets, as indicated in graphically in FIG. 6. Each CR amplitude set of the graph, $\{f,S(f;resp)\}_{f \in Fh}$, has several numerical characteristics associated with this set, including but not limited to: (1) a magnitude of a CR amplitude, denoted $|S(f_{h,g};resp)|$ and (2) a magnitude of a dimensionless slope or derivative, defined as $$DS(f_{h,g}) = \{|S(f_{h,3};resp) - S(f_{h,1};resp)|/|S(f_{h,2};resp)|, \quad (1)$$

where $f_{h,1}$, $f_{h,2}$ and $f_{h,3}$ are members of a frequency group $F_h$ satisfying $f_{h,1}<f_{h,2}<f_{h,3}$ (and, preferably, $f_{h,2}-f_{h,1} \approx f_{h,3}-f_{h,2}$). Preferably, at least one of the CR amplitudes $S(f_h;resp)$ is evaluated at the group frequency, $f=f_{h,g}$. Other dimensionless combinations, including at least one difference of two CR amplitude values, may also be used here.

The analysis module 42 determines a figure or merit or functional value $FV\{S(f_{h,g};resp),DS(f_{h,g})\}$ for these values for each of the TPS group frequencies (h=1, . . . , K-1) and identifies one or more group frequency indices, h=h0, having a functional value that satisfies $$FV\{S(f_{h0,g};resp),DS(f_{h0,g})\} \geq FV_{thr}, \quad (2)$$

where $FV_{thr}$ is a selected threshold value. The functional value FV may be a linear combination of, or a nonlinear function of one or both of, the numerical values, $|S(f_{h,g};resp)|$ and $DS(f_{h,g})$, and preferably is monotonically increasing with an increase in the variable $|S(f_{h,g};resp)|$ and is monotonically decreasing with an increase in the variable $DS(f_{h,g})$.

The first TPS group choice module 43 receives the signals $S(f_{h,g};resp) \cdot A(f_{h,g})$ for the TPS sets at a first input terminal, receives the selected index, h=h0, or the selected group frequency, $f=f_{h0,g}$, at a second input terminal, and issues an output CR signal $S(f_{h0,g};resp) \cdot A(f_{h0,g})$, which includes amplitudes A(f) for all frequencies in the group $F_{h0}$. This output CR signal is received by an inverse (fast) Fourier transform (IFT) module 44 that computes and issues a first TD signal D(t).

Figure 5:
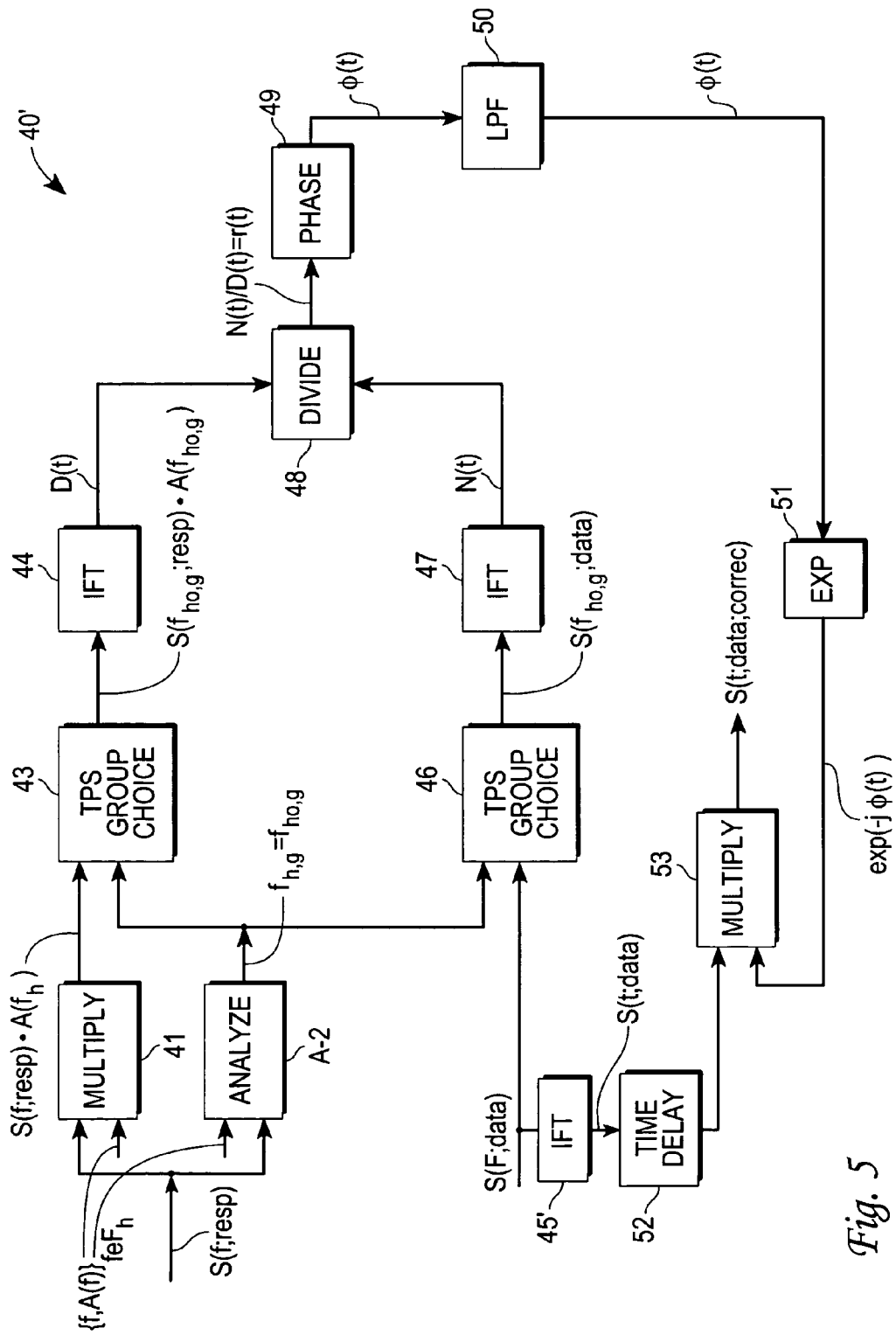

The receiver system 40 in FIG. 4 also receives the TD data portion s(t;data) from the transmission channel and passes this signal through a (fast) Fourier transform module 45 to produce the FD data portion S(f;data), which is received by a first input terminal of a second TPS group choice module 46. Alternatively, the FD data portion S(f;data) can be received and passed through an inverse (fast) Fourier transform module 45', as indicated in FIG. 5, to provide both the FD data portion S(f;data) and the TD data portion s(t;data).

In FIG. 4, the identified frequency index, h=h0, is received at a second input terminal of the TPS set choice module 46, which then issues an output data signal $S(f_{h0,g};$data), corresponding to this selected index. The output data signal $S(f_{h0,g};$data) is received by a second inverse (fast) Fourier transform (IFT) module 47 that computes and issues a second TD signal N(t). The signal N(t) issued by the IFT module 47 includes effects of phase noise. The signal D(t) issued by the IFT module 44 has no phase noise included. The signals N(t) and D(t) are received at a complex division module 48, which generates and issues a complex ratio signal $$r(t) = N(t)/D(t), \quad (3)$$

which is received by a phase module 49. The phase module 49 forms and issues a phase correction quantity $$\phi(t) = \tan^{-1}\{\{Im(r(t))/Re\{r(t)\}\}\}. \quad (4)$$

The phase correction quantity $\phi$(t) is optionally passed through a low pass filter 50, having a selected high pass cutoff that may be as high as several MHz. The low pass filter output signal $\phi$(t;LP), or $\phi$(t), is received by a complex exponential module 51 which generates and issues a complex phase output signal $\exp\{-j\phi(t)\}$. This phase output signal, $\exp\{-j\phi(t)\}$, representing an estimated phase correction for the received time domain data signal is received at a first input terminal of a second multiply module 53. The TD data portion s(t;data) is passed through a time delay module 52, with a selected time delay $\Delta$t(delay) corresponding to the time interval required to process s(t;data) through the modules 41–51, and is received at a second input terminal of the second multiply module 53, The second multiply module 53 generates and issues a phase-compensated received signal $$s(t;\text{data};\text{corr}) = \exp\{-j\phi(t)\} \cdot s(t;\text{data}). \quad (5)$$

Figure 7:
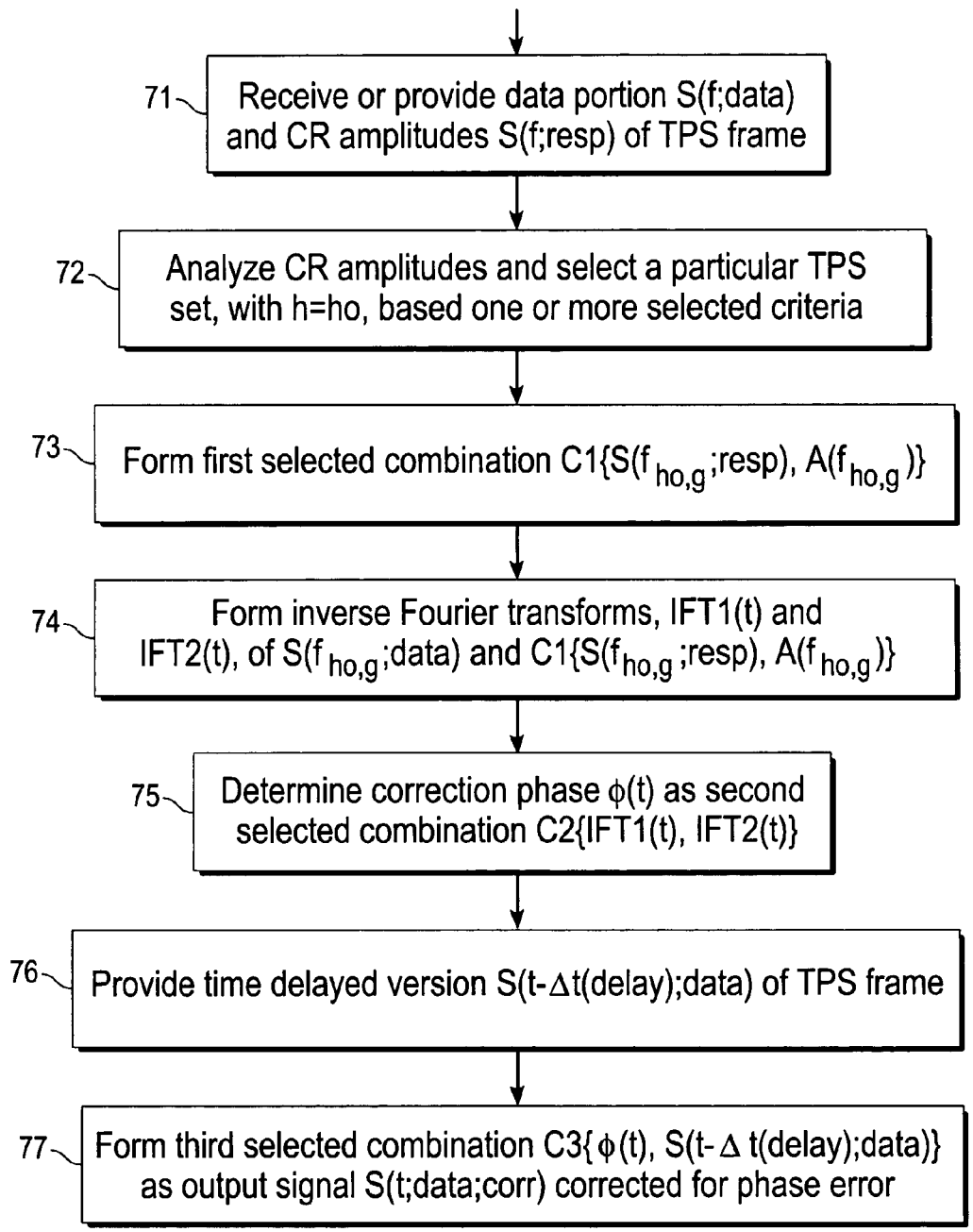

FIG. 7 is a flow chart of a procedure for practicing the invention according to the general embodiment shown in FIG. 3. In step 71, an FD signal, including a data portion S(f;data) and a CR amplitude S(f;resp) of a TPS frame, is received or provided. In step 72, the CR amplitude S(f;resp) is analyzed, and a particular CR amplitude set, $\{f,S(f;resp)\}_{f \in Fh}$ with h=h0, is determined or selected, based on one or more selected criteria. In step 73, a first selected combination $C1\{S(f_{h0,g};resp) \cdot A(f_{h0,g})\}$ of the indicated variables is formed. In step 74, inverse Fourier transforms, IFT1(t) and IFT2(t), are computed for the respective quantities $S(f_{h0,g};$data) and $C\{S(f_{h0,g};resp),A(f_{h0,g})\}$. In step 75, a correction phase $\phi$(t) is determined from a second combination $C2\{IFT1(t), IFT2(t)\}$ of the signals IFT1(t) and IFT2(t). In step 76, a time delayed TD version of the original signal s(t−$\Delta$t(delay);data) is received or provided. In step 77, the quantities $\phi$(t) and s(t−$\Delta$t(delay);data) are combined to provide an output signal s(t;data;corr) that is corrected for phase error.

Figure 8B:
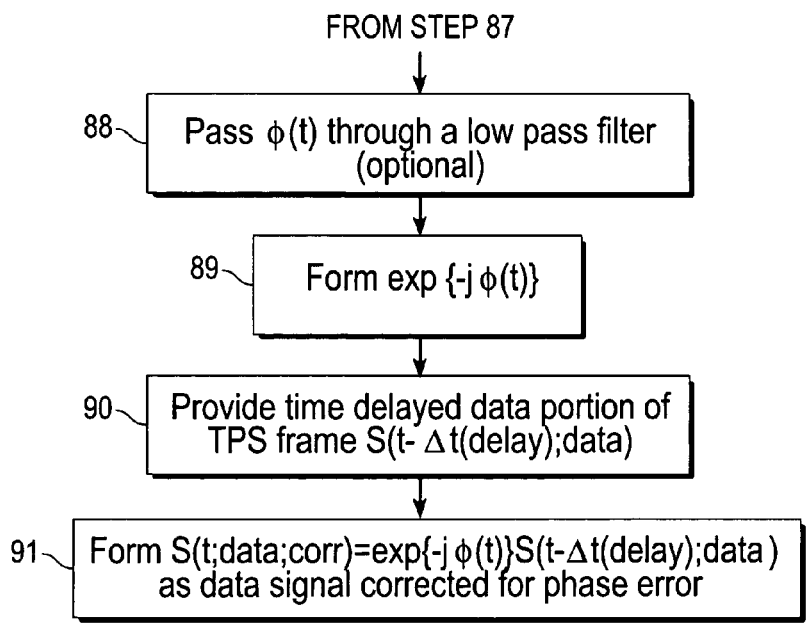
FIGS. 7 and 8A/8B are flow charts of procedures to practice the invention.
Figure 8A:
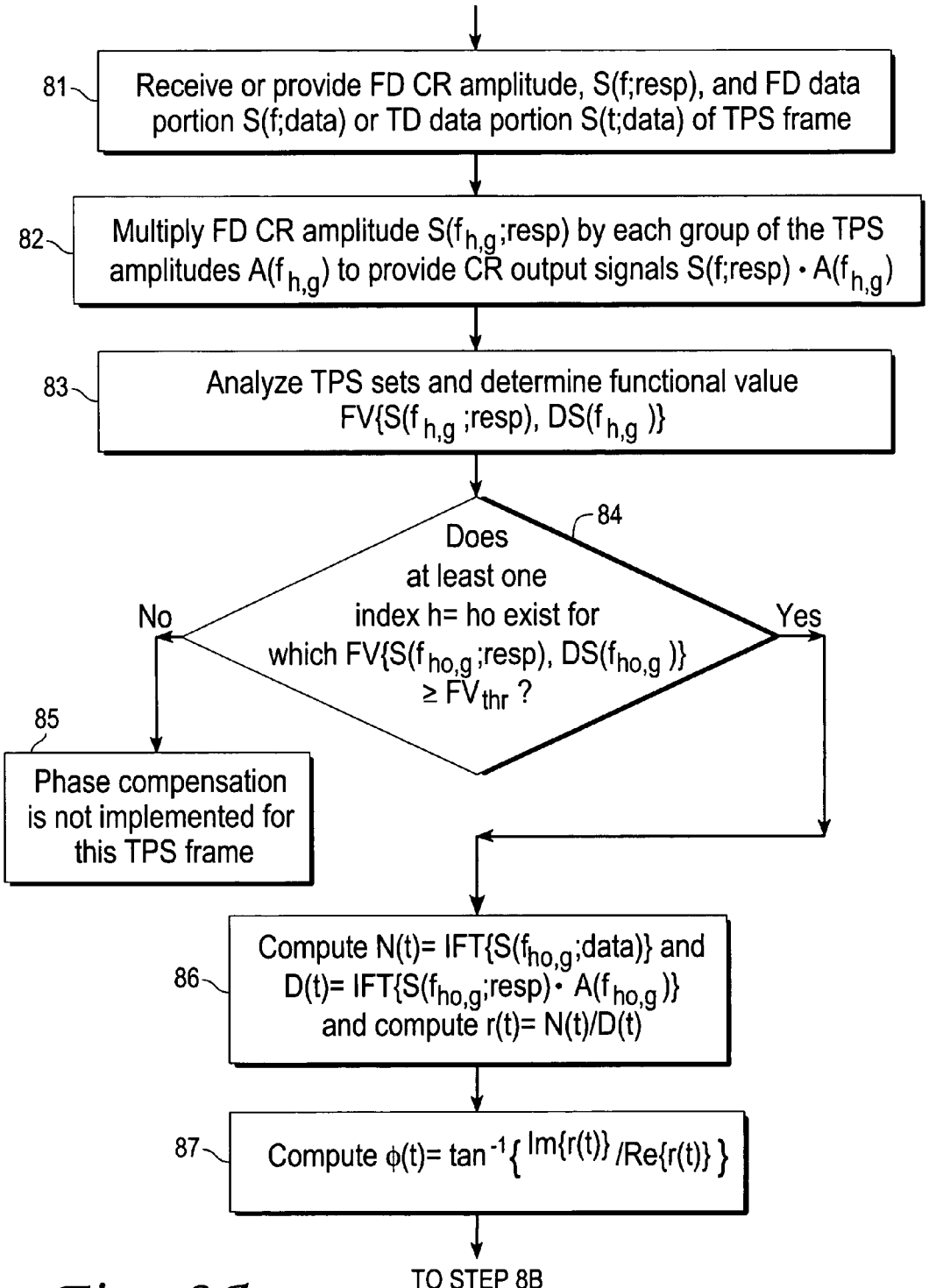

FIG. 8 is a flow chart of a procedure for practicing the invention, using a receiver system such as the one shown in FIG. 4 or FIG. 5. In step 81, the FD CR amplitude S(f;resp), and the FD data portion S(f;data) or the TD data portion s(t;data) of a TPS frame are provided for the receiver system, such as the system 40 shown in FIG. 4 or the system 40' shown in FIG. 5.

In step 82, the CR amplitude S(f;resp) is multiplied by each of the TPS amplitudes $A(f_{h,g})$ to provide an FD output CR signal $S(f_{h,g};\text{resp}) \cdot A(f_{h,g})$ for each of the K−1 frequency groups $F_h$. In step 83, the CR amplitude set $\{f, S(f;\text{resp})\}_{f \in Fh}$ corresponding to each of the TPS sets is analyzed, and a functional value or figure of merit $FV\{S(f_{h,g};\text{resp}), DS(f_{h,g})\}$ (h=1, ..., K−1) is determined for each of these sets. In step 84, the system determines if at least one index value, h=h0, exists that satisfies Eq. (2). If the answer to the query is "no" so that no group frequency, $f=f_{h0,g}$, exists that satisfies Eq. (2), phase noise compensation is not implemented for this frame, in step 85.

If the answer to the query in step 84 is "yes" so that at least one frequency, $f=f_{h0,g}$, exists that satisfies Eq. (2), an inverse Fourier transform N(t) of the FD data output signal $S(f_{h0,g};\text{data})$ and an inverse Fourier transform D(t) of the selected FD CR output signal $S(f_{h0,g};\text{resp}) \cdot A(f_{h0,g})$, both complex, are computed, in step 86; and a complex ratio r(t)=N(t)/D(t) is computed, corresponding to the chosen or identified index h=h0. In step 87, the arctangent corresponding to the ratio r(t) is computed (Eq. (4)) to provide a phase angle correction φ(t). In step 88 (optional), the phase angle correction signal is processed by a low pass filter to provide a low pass filtered version of the phase angle correction φ(t). In step 89, a complex exponential function exp{−jφ(t)} is formed. In step 90, a time delayed received signal s(t−Δt (delay);data) is received or provided. In step 91, the signal exp{−jφ(t)} and s(t−Δt(delay);data) are multiplied to provide a data signal s(t;data;corr) (Eq. (5)) that is corrected for phase noise.

The linear or nonlinear functional value FV{x,y} in Eq. (2) may have many different forms, consistent with the monotonicity requirements for each of the variables x and y. Examples of suitable functional values FV {x,y}, for which a maximum value of FV is sought, include $$FV\{x,y\} = a \cdot x - b \cdot y \quad (a, b > 0), \quad (6A)$$

$$FV\{x,y\} = f1(x) - f2(y), \quad (6B)$$

$$FV\{x,y\} = f3(x)/f4(y), \quad (6C)$$

$$FV\{x,y\} = G1\{f1(x) - f2(y)\}, \quad (6D)$$

$$FV\{x,y\} = G2\{f3(x)/f4(y)\}, \quad (6E)$$

where f1(~), f2(~), f3(~), f4(~), G1{·} and G2{·} are positive and monotonically increasing in the indicated variable. Examples of functional values, for which an extremum value of the function is sought, include $$FV\{x,y\} = \{a + b \sim G(x,y)\}^{-c}, \quad (7)$$

where a is a non-negative constant, b and c are both positive or both negative, and G(x,y) is monotonically increasing in the variable |x| and is monotonically decreasing in the variable y.

In another (preferred) embodiment of determination of the functional value FV{x,y}, the TPS set choice modules in FIG. 3, 4 or 5 select at least one TPS frequency group (indicated by the group frequency $f=f_{h,g}$) for use in subsequent computations in the following manner.

1. Order the slope magnitudes $DS(f_{h,g})$ in increasing order, with $DS(f_{h,g,1}) \leq DS(f_{h,g,2}) \leq \ldots \leq DS(f_{h,g,K-1})$.
2. Initially choose the center group corresponding to $f=f_{h,g,1}$; if $DS(f_{h,g,1}) > 0.2$, the received TPS set signals are inherently unreliable, and no phase compensation is applied to this frame.
3. Compute a statistical average, denoted Avg{resp}, of the CR amplitudes S(f;resp) of the frame; this statistical average may be a weighted arithmetic mean, a median, a mode or any other suitable statistical average.
4. If the slope magnitude and corresponding CR amplitude (magnitude) satisfy $DS(f_{h,g,i}) < 0.05$ and $|S(f_{h,g,1};\text{resp})| \leq 0.9 \cdot \text{Avg}\{\text{resp}\}$ for at least one group frequency $f=f_{h,g,i}$, any corresponding group frequency that satisfies both conditions can provide the chosen index h=h0, the choice procedure terminates here, and the system sets $FV\{S(f_{h,g};\text{resp}), DS(f_{h,g})\} = FV_{thr}$, where $FV_{thr}$ is a selected threshold value.

Assume, in the following steps 5–7, that the CR (amplitude, slope) pair does not satisfy at least one of the two conditions set forth in step 4;

5. If $S(f_{h,g,i};\text{resp}) < 0.9 \cdot \text{Avg}\{\text{resp}\}$ for each of an initial sequence of indices i=1, ..., I−1 (I=2 ..., K−1), and if $0.05 \leq DS(f_{h,g,I}) \leq 0.2$ and $S(f_{h,g,I};\text{resp}) \geq 0.9 \cdot \text{Avg}\{\text{resp}\}$ for $f_{h,g,I}$ (if such a frequency exists), the system chooses the TPS group frequency $f=f_{h,g,i=I}=f_{h0,g}$, for further processing, and sets $FV\{S(f_{h0,g};\text{resp}), DS(f_{h0},g)\} = FV_{thr}$; and the procedure terminates here.
6. If $S(f_{h,g,i};\text{resp}) < 0.8 \cdot \text{Avg}\{\text{resp}\}$ for each of an initial sequence of indices i'=1, ..., I'−1 (I'=2, ..., K−1) and if $0.05 \leq DS(f_{h,g,I'}) \leq 0.2$ and $0.8 \sim \text{Avg}\{\text{resp}\} \leq S(f_{h,g,I'};\text{resp}) < 0.9 \cdot \text{Avg}\{\text{resp}\}$, the system chooses the TPS group frequency $f=f_{h,g,I'}=f_{h0,g}$ for further processing, and sets $FV\{S(f_{h0,g};\text{resp}), DS(f_{h0,g})\} = FV_{thr}$; and the procedure terminates here.
7. If $S(f_{h,g,i};\text{resp}) < 0.8 \cdot \text{Avg}\{\text{resp}\}$ (i=1, ..., K−1), no phase compensation is applied to this frame; and the procedure terminates for this frame.

The threshold coefficients "0.8" and "0.9" appearing in the preceding steps 4, 5, 6 and 7 can be replaced by generalized threshold coefficients, $$0.8 \rightarrow \chi 1,$$

$$0.9 \rightarrow \chi 2,$$

where $0.7 \leq \chi 1 < \chi 2$.

The range coefficients "0.05" and "0.2" appearing in the preceding steps 2, 4, 5 and 6 can be replaced by generalized range coefficients, $$0.05 \rightarrow \chi 3,$$

$$0.2 \rightarrow \chi 4,$$

where $0 < \chi 3 < \chi 4 \leq 0.3$.

What is claimed is:

1. A method for estimating phase error in a received signal, the method comprising:

providing a frequency domain (FD) signal for a TPS frame, where the signal includes a channel response (CR) portion and a data portion and includes K−1 transmission parameter symbol (TPS) sets, with each TPS set having a TPS group frequency, $f=f_{h,g}$ (h=1, ..., K−1), and including a set of (frequency, amplitude) pairs of values $\{f, A(f)\}_{f \in F}$ for a selected group F of frequencies f, where A(f) is an amplitude associated with a TPS set and K is a selected integer $\geq 2$;

processing the CR portion and the data portion to provide an FD CR amplitude S(f;resp) and an FD data portion S(f;data);

selecting a TPS set and a corresponding index h=h0, according to one or more selected criteria;

estimating a phase correction factor $\phi(t)$, using the CR amplitudes S(f;resp) and the data portion S(f;data) for the TPS set with group frequency $f_{h0,g}$;

providing time delayed version of a time domain (TD) received data signal s(t−Δt(delay);data) for the TPS frame; and forming a selected combination C3{s(t−Δt(delay);data),$\phi$(t)} as an estimate of the received data signal, corrected for phase error, s(t−Δt(delay);data;corr).

2. The method of claim 1, wherein said estimating said phase correction factor $\phi(t)$ comprises:

forming a first selected combination C1{S($f_{h0,g}$;resp);A($f_{h0,g}$)} of quantities S($f_{h0,g}$;resp) and A($f_{h0,g}$); and forming a second selected combination, C2{C1{S($f_{h0,g}$;resp);A($f_{h0,g}$)},S($f_{h0,g}$;data)}, of the first combination and said output data portion, as said estimate of said phase correction factor $\phi(t)$ associated with said TPS frame.

3. The method of claim 2, further comprising selecting said first combination C1 to be C1{S($f_{h0,g}$;resp);A($f_{h0,g}$)}=S($f_{h0,g}$;resp)~A($f_{h0,g}$).

4. The method of claim 3, further comprising selecting said second combination C2 according to a process comprising computation of:

$$r(t)=IFT\{S(f_{h0,g};data)/IFT\{S(f_{h0,g};resp)\cdot A(f_{h0,g})\}\}; \text{ and}$$

$$\phi(t)=C2\{C1\{S(f_{h0,g};resp)\cdot A(f_{h0,g}), S(f_{h0,g};data)\}=Im\{r(t)\}/Re\{r(t)\},$$

where IFT{H(f)} is an inverse Fourier transform of an FD function H(f).

5. The method of claim 1, further comprising selecting said combination C3 to be $$C3\{s(t-\Delta t(delay);data),\phi(t)\}=s(t-\Delta t(delay);data)\cdot\exp\{-j\phi(t)\}.$$

6. The method of claim 1, wherein said selecting said TPS set and said corresponding index, h=h0, comprises:

estimating a CR amplitude S(f;resp) and a dimensionless slope DS(f) of the CR amplitude corresponding to each of said TPS group frequencies, f=$f_{h,g}$;

determining a functional value FV{S($f_{h,g}$;resp),DS($f_{h,g}$)} for said group frequencies for said TPS sets, and determining at least one TPS group frequency, $f_{h,g}$=f'$_{h,g}$, whose functional value FV{S(f'$_{h,g}$;resp),DS(f'$_{h,g}$)} is at least equal to a selected threshold value FV$_{thr}$; and selecting said group frequency $f_{h0,g}$=f'$_{h,g}$.

7. The method of claim 6, wherein said determining said at least one TPS group frequency, $f_{h,g}$=$f_{h0,g}$, with said functional value FV{S($f_{h0,g}$;resp),DS($f_{h0,g}$)} at least equal to said selected threshold value FV$_{thr}$, comprises:

determining whether said at least one TPS group frequency f'$_{h,g}$ exists for which (1) said CR amplitude value S(f'$_{h,g}$;resp) satisfies $\chi 1\cdot$Avg(resp)$\leq$S(f'$_{0,g}$;resp) where $\chi 1$ is a selected value at least equal to 0.7 and Avg(resp) is a statistical average value of said CR amplitudes and (2) said slope value DS(f'$_{h,g}$) satisfies $\chi 3\leq$DS(f'$_{h,g}$)$\leq\chi 4$, where $\chi 3$ and $\chi 4$ are fractions satisfying 0<$\chi 3$<$\chi 4\leq 0.3$.

8. The method of claim 7, further comprising:

when said at least one TPS group frequency f'$_{h,g}$ exists that satisfies the conditions (1) and (2), selecting the frequency f'$_{h,g}$ as said group frequency $f_{h0,g}$.

9. The method of claim 7, further comprising:

when no TPS group frequency f'$_{h,g}$ exists that satisfies both of the conditions (1) and (2), interpreting this as indicating that phase error cannot be compensated for in said TPS frame.

10. The method of claim 6, wherein said determining said at least one TIPS group frequency, $f_{h,g}$=f'$_{h,g}$, with said functional value FV{S($f_{h0,g}$;resp),DS($f_{h0,g}$)} at least equal to said selected threshold value FV$_{thr}$, comprises:

determining whether at least one TPS group frequency f'$_{h,g}$ exists that satisfies a constraint condition $$\{a+b\cdot G(S(f'_{h,g};resp),DS(f'_{h,g}))\}^{-c}\geq FV_{thr},$$

where G(x,y) is a function that is monotonically increasing in the variable |x| and is monotonically decreasing in the variable y, a is a selected non-negative value, and b and c are selected values that are both positive or are both negative.

11. The method of claim 10, further comprising:

when said at least one TPS group frequency f'$_{h,g}$ exists that satisfies said constraint condition, selecting the frequency f'$_{h,g}$ as said group frequency $f_{h0,g}$.

12. The method of claim 10, further comprising:

when no TPS group frequency f'$_{h,g}$ exists that satisfies said constraint condition, interpreting this as indicating that phase error cannot be compensated for in said TPS frame.

13. A system for estimating phase error in a received signal, the system comprising a computing device that is programmed:

to provide a frequency domain (FD) signal for a TPS frame, where the signal includes a channel response (CR) portion and a data portion, and where the CR portion includes K−1 transmission parameter symbol (TPS) sets, with each TPS set having a TPS group frequency, f=$f_{h,g}$(h=1, ..., K−1), and including a set of (frequency,amplitude) pairs of values {f,A(f)}$_{f\in F}$ for a selected group F of frequencies f, where A(f) is an amplitude associated with a TPS set and K is a selected integer $\geq 2$;

to process the CR portion and the data portion to provide an FD CR amplitude S(f;resp) and an FD data portion S(f;data);

to select a TPS set and a corresponding index h=h0, according to one or more selected criteria;

to estimate a phase correction factor $\phi(t)$, using the CR amplitudes S(f;resp) and the data portion S(f;data) for the TPS set with group frequency $f_{h0,g}$;

to provide time delayed version of a time domain (TD) received data signal s(t−Δt(delay);data) for the TPS frame; and to form a selected combination C3{s(t−Δt(delay);data),$\phi$t)} as an estimate of the received data signal, corrected for phase error, s(t−Δt(delay);data;corr).

14. The system of claim 13, wherein said computing device is programmed to estimate said phase correction factor $\phi(t)$ by a process comprising:

forming a first selected combination C1{S($f_{h0,g}$;resp);A($f_{h0,g}$)}; and forming a second selected combination, C2{C1{S($f_{h0,g}$;resp);A($f_{h0,g}$)},S($f_{h0,g}$;data)}, of the first combination and the output data portion as said estimate of said phase correction factor $\phi(t)$ associated with the TPS frame.

15. The system of claim 14, wherein said first combination C1 is selected to be C1$\{S(f_{h0,g};\text{resp});A(f_{h0,g})\}=S(f_{h0,g};\text{resp})\cdot A(f_{h0,g})$.

16. The system of claim 14, wherein said second combination C2 is selected according to a process comprising: computation of $$r(t)=IFT\{S(f_{h0,g};\text{data})/IFT\{S(f_{h0,g};\text{resp})\cdot A(f_{h0,g})\}\}; \text{ and}$$

$$\phi(t)=C2\{C1\{S(f_{h0,g};\text{resp})\cdot A(f_{h0,g}), S(f_{h0,g};\text{data})\}=Im\{r(t)\}/Re\{r(t)\},$$

where IFT{H(f)} is an inverse Fourier transform of an FD function H(f).

17. The system of claim 13, wherein said combination C3 is selected to be $$C3\{s(t-\Delta t(\text{delay});\text{data}),\phi(t)\}=s(t-\Delta t(\text{delay});\text{data})\cdot \exp\{-j\phi(t)\}.$$

18. The system of claim 13, wherein said computer is further programmed to select said TPS set and said corresponding index, h=h0, by a process comprising:
   estimating a CR amplitude S(fresp) and a dimensionless slope DS(f) of the CR amplitude corresponding to each of said TPS group frequencies, f=$f_{h,g}$;
   determining a functional value FV$\{S(f_{h,g};\text{resp}),DS(f_{h,g})\}$ for said group frequencies for said TPS sets, and determining at least one TPS group frequency, $f_{h,g}=f'_{h,g}$, whose functional value FV$\{S(f'_{h,g};\text{resp}),DS(f'_{h,g})\}$ is at least equal to a selected threshold value $FV_{thr}$; and
   selecting said group frequency $f_{h0,g}=f'_{h,g}$.

19. The system of claim 18, wherein said computer is further programmed to determine said at least one TPS group frequency $f'_{h,g}$ with said functional value FV$\{S(f'_{h,g};\text{resp}),DS(f'_{h,g})\}$ at least equal to said selected threshold value $FV_{thr}$, by a process comprising:
   determining whether at least one TPS group frequency $f'_{h,g}$ exists for which (1) said CR amplitude value S($f'_{h,g}$;resp) satisfies $\chi1\cdot\text{Avg}(\text{resp})\leq S(f'_{h,g};\text{resp})$ where $\chi1$ is a selected value at least equal to 0.7 and Avg(resp) is a statistical average value of said CR amplitudes and (2) said slope value DS($f'_{h,g}$) satisfies $\chi3\leq DS(F'_{h,g})\leq\chi4$, where $\chi3$ and $\chi4$ are fractions satisfying $0<\chi3<\chi4\leq0.3$.

20. The system of claim 19, wherein said computer is further programmed so that:
   when said at least one TPS group frequency $f'_{h,g}$ exists that satisfies the conditions (1) and (2), selecting the frequency $f'_{h,g}$ as said group frequency $f_{h0,g}$.

21. The system of claim 19, wherein said computer is further programmed so that:
   when no TPS group frequency $f'_{h,g}$ exists that satisfies both of the conditions (1) and (2), interpreting this as indicating that phase error cannot be compensated for in said TPS frame.

22. The system of claim 18, wherein said computer is further programmed to determine said at least one TPS group frequency, $f_{h,g}=f'_{h,g}$, with said functional value FV$\{S(f_{h0,g};\text{resp}),DS(f_{h0,g})\}$ at least equal to said selected threshold value $FV_{thr}$, by a process comprising:
   determining whether at least one TPS group frequency $f'_{h,g}$ exists that satisfies a constraint condition $$\{a+b\cdot G(S(f'_{h,g};\text{resp}),DS(f'_{h,g}))\}^{-c}\geq FV_{thr},$$

where G(x,y) is a function that is monotonically increasing in the variable |x| and is monotonically decreasing in the variable y, a is a selected non-negative value, and b and c are selected values that are both positive or are both negative.

23. The system of claim 22, wherein said computer is further programmed so that:
   when said at least one TPS group frequency $f'_{h,g}$ exists that satisfies said constraint condition, selecting the frequency $f'_{h,g}$ as said group frequency $f_{h0,g}$.

24. The system of claim 22, wherein said computer is further programmed so that:
   when no TPS group frequency $f'_{h,g}$ exists that satisfies said constraint condition, interpreting this as indicating that phase error cannot be compensated for in said TPS frame.

* * * * *